(12) United States Patent
Park et al.

(10) Patent No.: US 8,698,789 B2
(45) Date of Patent: Apr. 15, 2014

(54) DISPLAY APPARATUS INCLUDING SUB-LIGHT SOURCE GROUPS

(75) Inventors: Young-Min Park, Seoul (KR); Gicherl Kim, Asan-si (KR); Sang-Il Park, Seoul (KR); Hee-Kwang Song, Anyang-si (KR); Ho-Sik Shin, Anyang-si (KR)

(73) Assignee: Samsung Display Co., Ltd. (KR)

( * ) Notice: Subject to any disclaimer, the term of this patent is extended or adjusted under 35 U.S.C. 154(b) by 778 days.

(21) Appl. No.: 12/686,679

(22) Filed: Jan. 13, 2010

(65) Prior Publication Data

US 2011/0037685 A1 Feb. 17, 2011

(30) Foreign Application Priority Data

Aug. 14, 2009 (KR) .................. 10-2009-0075274

(51) Int. Cl.
*G09G 3/36* (2006.01)

(52) U.S. Cl.
USPC ........................... 345/211; 345/102; 362/229

(58) Field of Classification Search
USPC .............................. 345/87, 102; 362/229, 29
See application file for complete search history.

(56) References Cited

U.S. PATENT DOCUMENTS

| | | | | |
|---|---|---|---|---|
| 7,318,664 B2 * | 1/2008 | Hatanaka et al. | ............. | 362/555 |
| 7,461,962 B2 * | 12/2008 | Lee et al. | ............. | 362/613 |
| 7,540,643 B2 * | 6/2009 | Hu et al. | ............. | 362/551 |
| 7,671,832 B2 * | 3/2010 | Lankhorst et al. | ............. | 345/102 |
| 7,696,964 B2 * | 4/2010 | Lankhorst et al. | ............. | 345/82 |
| 7,717,601 B2 * | 5/2010 | Tan et al. | ............. | 362/613 |
| 7,736,047 B2 * | 6/2010 | Ohashi et al. | ............. | 362/631 |
| 7,905,618 B2 * | 3/2011 | Kim et al. | ............. | 362/97.3 |
| 8,025,435 B2 * | 9/2011 | Tatehata et al. | ............. | 362/616 |
| 8,067,897 B2 * | 11/2011 | Park et al. | ............. | 315/291 |
| 8,144,084 B2 * | 3/2012 | Miller et al. | ............. | 345/76 |
| 2002/0167016 A1 * | 11/2002 | Hoelen et al. | ............. | 257/89 |
| 2004/0227869 A1 * | 11/2004 | Martynov et al. | ............. | 349/61 |
| 2005/0001537 A1 * | 1/2005 | West et al. | ............. | 313/500 |
| 2005/0046951 A1 * | 3/2005 | Sugihara et al. | ............. | 359/619 |
| 2005/0259439 A1 * | 11/2005 | Cull et al. | ............. | 362/612 |
| 2006/0038771 A1 * | 2/2006 | Hirakata et al. | ............. | 345/102 |
| 2006/0049781 A1 * | 3/2006 | Lee et al. | ............. | 315/312 |
| 2006/0205242 A1 * | 9/2006 | Noh et al. | ............. | 439/57 |
| 2006/0215388 A1 * | 9/2006 | Hamada | ............. | 362/29 |

(Continued)

FOREIGN PATENT DOCUMENTS

| | | |
|---|---|---|
| JP | 2009-087537 A | 4/2009 |
| KR | 100755615 B1 | 8/2007 |
| KR | 1020080051499 A | 6/2008 |

*Primary Examiner* — Amare Mengistu
*Assistant Examiner* — Sarvesh J Nadkarni
(74) *Attorney, Agent, or Firm* — Cantor Colburn LLP

(57) ABSTRACT

A display apparatus includes; a display panel which displays an image using a light, wherein the display panel is divided into a plurality of display areas corresponding to the image, a plurality of main-light source groups which each have a plurality of light sources, wherein the main-light source groups are arranged respectively corresponding to the display areas to provide the light thereto, a power source circuit is connected to each main-light source groups to provide a corresponding driving power to each of the main-light source groups, and a plurality of sub-light source groups, each of which is arranged between two adjacent main-light source groups and wherein each sub-light group receives the driving power applied to each of the two main-light source groups adjacent thereto to provide a light corresponding to an average brightness of the two adjacent main-light source groups to a border area between two adjacent display areas.

17 Claims, 9 Drawing Sheets

(56) References Cited

U.S. PATENT DOCUMENTS

| | | | |
|---|---|---|---|
| 2006/0220040 A1* | 10/2006 | Suzuki | 257/89 |
| 2006/0221636 A1* | 10/2006 | Ohashi et al. | 362/612 |
| 2006/0227085 A1* | 10/2006 | Boldt et al. | 345/83 |
| 2006/0279478 A1* | 12/2006 | Ikegami | 345/30 |
| 2007/0002580 A1* | 1/2007 | Ahn et al. | 362/561 |
| 2007/0013647 A1* | 1/2007 | Lee et al. | 345/102 |
| 2007/0024570 A1* | 2/2007 | Kumamoto | 345/102 |
| 2007/0195025 A1* | 8/2007 | Korcharz et al. | 345/82 |
| 2007/0211013 A1* | 9/2007 | Uehara et al. | 345/102 |
| 2007/0242477 A1* | 10/2007 | Yoo et al. | 362/612 |
| 2007/0247871 A1* | 10/2007 | Yoo | 362/612 |
| 2007/0257943 A1* | 11/2007 | Miller et al. | 345/694 |
| 2007/0257946 A1* | 11/2007 | Miller et al. | 345/694 |
| 2007/0262732 A1* | 11/2007 | Shen | 315/312 |
| 2007/0284994 A1* | 12/2007 | Morimoto et al. | 313/483 |
| 2007/0285378 A1* | 12/2007 | Lankhorst et al. | 345/102 |
| 2008/0007509 A1* | 1/2008 | Lankhorst et al. | 345/102 |
| 2008/0018830 A1* | 1/2008 | Negley | 349/69 |
| 2008/0074382 A1* | 3/2008 | Lee et al. | 345/102 |
| 2008/0129927 A1* | 6/2008 | Hamada et al. | 349/65 |
| 2008/0136352 A1* | 6/2008 | Paeng et al. | 315/294 |
| 2008/0238839 A1* | 10/2008 | Kim et al. | 345/83 |
| 2009/0066629 A1* | 3/2009 | Hsu et al. | 345/102 |
| 2009/0086473 A1* | 4/2009 | Tan et al. | 362/229 |
| 2009/0201669 A1* | 8/2009 | Hamada | 362/97.3 |
| 2009/0310338 A1* | 12/2009 | Negley | 362/97.1 |
| 2010/0052564 A1* | 3/2010 | Park et al. | 315/291 |
| 2010/0208164 A1* | 8/2010 | Ohashi et al. | 349/62 |
| 2010/0283720 A1* | 11/2010 | Segawa et al. | 345/102 |
| 2010/0289722 A1* | 11/2010 | Kitazawa | 345/1.1 |
| 2010/0309194 A1* | 12/2010 | Shin et al. | 345/214 |
| 2011/0032728 A1* | 2/2011 | Nagata et al. | 362/606 |

* cited by examiner

DISPLAY APPARATUS INCLUDING SUB-LIGHT SOURCE GROUPS

This application claims priority to Korean Patent Application No. 2009-75274, filed on Aug. 14, 2009, and all the benefits accruing therefrom under 35 U.S.C. §119, the content of which in its entirety is herein incorporated by reference.

BACKGROUND OF THE INVENTION

1. Field of the Invention

The present invention relates to a display apparatus. More particularly, the present invention relates to a display apparatus capable of preventing a display defect thereof.

2. Description of the Related Art

A liquid crystal display ("LCD") typically includes an LCD panel having a liquid crystal layer disposed between two substrates. The LCD controls a transmittance of a light passing through the liquid crystal layer to display an image. However, since the LCD is not a self-emissive display, i.e., it does not generate light itself, the LCD requires an additional light source such as a backlight unit.

The backlight unit typically provides the light to the LCD panel using a plurality of light sources. However, since the LCD panel receives light from multiple light sources, a brightness difference may occur between areas to which the light is more directly incident and areas to which the light is less directly incident, thereby causing deterioration in image display quality, for example the generation of alternating light and dark lines on the display.

BRIEF SUMMARY OF THE INVENTION

An exemplary embodiment of the present invention provides a display apparatus capable of preventing display defects due to brightness differences.

In an exemplary embodiment of the present invention, a display apparatus includes: a display panel which displays an image using a light, wherein the display panel is divided into a plurality of display areas corresponding to the image, a plurality of main-light source groups which each have a plurality of light sources, wherein the plurality of main-light source groups are respectively arranged corresponding to the plurality of display areas to provide the light to the plurality of display areas, a power source circuit connected to each main-light source group to supply a corresponding driving power to each main-light source group, and a plurality of sub-light source groups, each of which is arranged between two adjacent main-light source groups of the plurality of main-light source groups and wherein each sub-light group receives the driving power applied to each of the two main-light source groups adjacent thereto to provide a light corresponding to an average brightness of the two adjacent main-light source groups to a border area between two adjacent display areas of the plurality of display areas.

According to an exemplary embodiment, the display apparatus further includes a circuit substrate having at least one layer on which the power source circuit is arranged, wherein the plurality of light sources are mounted thereon.

According to an exemplary embodiment, each light source includes a light emitting device which generates the light.

According to an exemplary embodiment, each light source includes a first light emitting device and a second light emitting device to generate the light.

According to an exemplary embodiment, each light source includes a first light emitting device, a second light emitting device, and a third light emitting device to generate the light.

According to an exemplary embodiment, the display apparatus further includes a light guide plate arranged adjacent to the main-light source groups and the sub-light source groups to guide the light emitted from the main-light source groups and the sub-light source groups to each of the display areas of the display panel.

In another exemplary embodiment of the present invention, a display apparatus includes; a display panel which displays an image using a light, wherein the display panel is divided into a plurality of display areas corresponding to the image, a plurality of main-light source groups each having a plurality of light sources, wherein the plurality of main-light source groups are respectively arranged corresponding to the display areas and provide the light to the display areas, a power source circuit connected to each of the plurality of main-light source groups, wherein the power source circuit supplies a corresponding driving power to the plurality of main-light source groups, and at least one sub-light source group arranged between a first main-light source group of the plurality of main-light source groups and a second main-light source group of the plurality of main-light source groups, wherein the at least one sub-light source group is arranged adjacent to, and receives a driving power applied to, the first main-light source group and wherein the at least one sub-light source group is arranged adjacent to, and receives a driving power applied to, the second main-light source group and provides a light corresponding to an average brightness of the first and second main-light source groups to a border area between a first display area and a second display area adjacent to one another and corresponding to the first main-light source group and the second main-light source group, respectively.

According to the above, the main-light source groups are arranged respectively corresponding to the display areas of the display panel and the sub-light source groups are arranged between the main-light source groups, so that a brightness difference between adjacent display areas decreases, thereby reducing defects in display quality caused by the brightness difference.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION OF THE INVENTION

Figure 1:
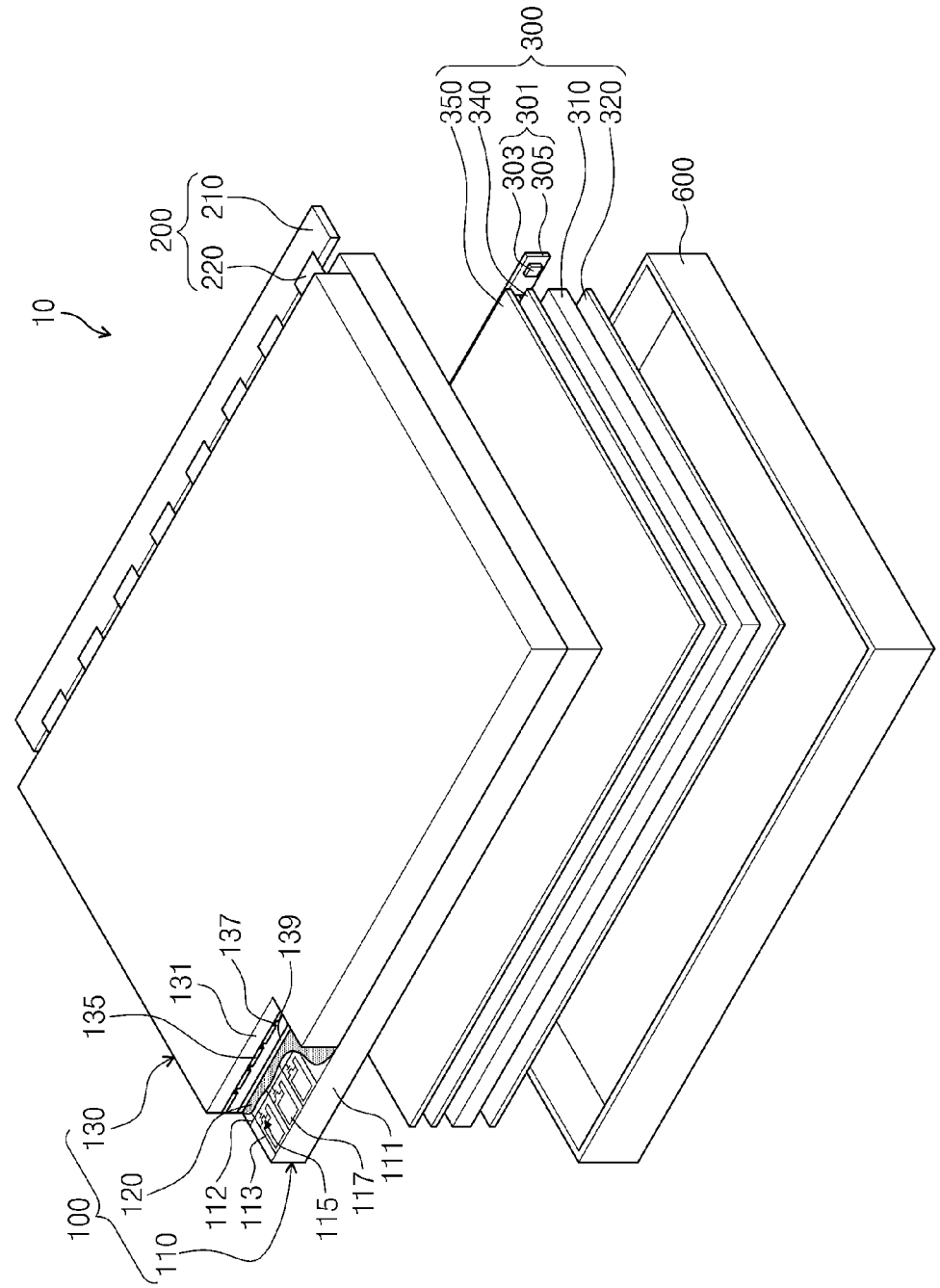
FIG. 1 is an exploded perspective view showing an exemplary embodiment of a display apparatus according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on" another element, it can be directly on the other element or intervening elements may be present. In contrast, when an element is referred to as being "directly on" another element, there are no intervening elements present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be explained in detail with reference to the accompanying drawings.

FIG. 1 is an exploded perspective view showing an exemplary embodiment of a display apparatus according to the present invention.

Referring to FIG. 1, a display apparatus 10 includes a display panel 100, a drive circuit 200, a backlight unit 300 and a chassis 600.

The display panel 100 receives light and displays an image using the same. The display panel 100 includes a first substrate 110, a second substrate 130 facing the first substrate 110 and a liquid crystal layer 120 interposed between the first and second substrates 110 and 130 to control an amount of light transmission therethrough to produce grayscales to display the image.

In the present exemplary embodiment, the first substrate 110 includes a first base substrate 111 including glass, plastic or another material with similar characteristics, a plurality of gate lines 112 extending in a first direction on the first base substrate 111 and being spacing apart from each other in a second direction that is substantially perpendicular to the first direction, a plurality of data lines 113 extending in the second direction, a plurality of thin film transistors 115, each of which is connected to a corresponding gate line among the gate lines 112 and a corresponding data line among the data lines 113, and pixel electrodes 117 connected to the thin film transistors 115, respectively. For the convenience of explanation, only one gate line among the gate lines 112 has been shown in FIG. 1, and the gate lines 112, the data lines 113, the thin film transistors 115, and the pixel electrodes 117 are respectively referred to using the representative reference numerals as described above.

In the present exemplary embodiment, the second substrate 130 includes a second base substrate 131 including glass, plastic or another material with similar characteristics, and a plurality of color filters 135 arranged on the second base substrate 131 corresponding to the pixel electrodes 117, respectively. In addition, the second substrate 130 includes a black matrix 137 interposed between adjacent color filters among the color filters 135 and a common electrode 139 forming an electric field with the pixel electrodes 117 to drive the liquid crystal layer 120. Although an exemplary embodiment of a liquid crystal display ("LCD") utilizing field generating electrodes disposed on opposing substrates has been illustrated in FIG. 1, the present invention is applicable to various types of display devices requiring a backlight, e.g., LCDs utilizing in-plane switching, electro-micro-mechanical displays, etc., and the present invention is not limited thereto.

The drive circuit 200 includes a gate driver (not shown), a data driver (not shown), a controller (not shown) and a circuit substrate 210 in order to provide various driving signals to the display panel 100. The gate driver, the data driver and the controller are mounted on the circuit substrate 210, and the circuit substrate 210 is connected to the first substrate 110 using a plurality of signal transmission substrates 220. While the present exemplary embodiment has been illustrated using a plurality of signal transmission substrates 220, alternative exemplary embodiments include configurations wherein only one signal transmission substrate 220 may be utilized or configurations wherein the drive circuit 200 is included directly on one of the substrates of the display panel 100 or configurations wherein the gate driver may be mounted on the first substrate 110 in a chip format and the data driver may be mounted on the signal transmission substrates 220 or the first substrate 110 in a chip format.

In the present exemplary embodiment, the backlight unit 300 includes an optical unit 301, a light guide plate 310, a reflection sheet 320, a diffusion sheet 340, and a prism sheet 350 to provide light to the display panel 100.

In the present exemplary embodiment, the optical unit 301 is arranged corresponding to a side of the display panel 100. The optical unit 301 includes a plurality of light sources 303 and a circuit substrate 305 on which the light sources 303 are mounted. The circuit substrate 305 provides a driving power to the light sources 303 and emits heat generated from the light sources 303 to the exterior of the display apparatus 10.

The light guide plate 310 includes a transparent material that refracts the light incident thereto. The light guide plate 310 changes a proceeding direction of the light that is incident to an incident surface thereof, wherein the incident surface of the light guide plate 310 is disposed adjacent to the optical unit 301. The light guide plate 310 refracts the incident light while the incident light proceeds inside the light guide plate 310 to provide the refracted light to the display panel 100 in a substantially uniform manner.

The reflection sheet 320 is arranged under the light guide plate 310 and, in one exemplary embodiment, includes a light reflection layer arranged on a base sheet. The reflection sheet 320 reflects light leaked through a lower portion of the light guide plate 310 to decrease loss of the light while guiding the light by the light guide plate 310.

The diffusion sheet 340 is arranged on the light guide plate 310 and receives light exiting from the light guide plate 310. The diffusion sheet 340 diffuses and outputs light received thereby, so that the light may be uniformly incident to the display panel 100.

The prism sheet 350 is arranged on the diffusion sheet 340 and receives light exiting from the diffusion sheet 340. The prism sheet 350 condenses the light such that the light is incident substantially perpendicular to the display panel 100. Exemplary embodiments include configurations wherein a plurality of either, or both, of the diffusion sheet 340 and the prism sheet 350 may be included.

The chassis 600 contains the display panel 100 and the backlight unit 300 and protects the display panel 100 and the backlight unit 300 from external impacts.

Figure 2:
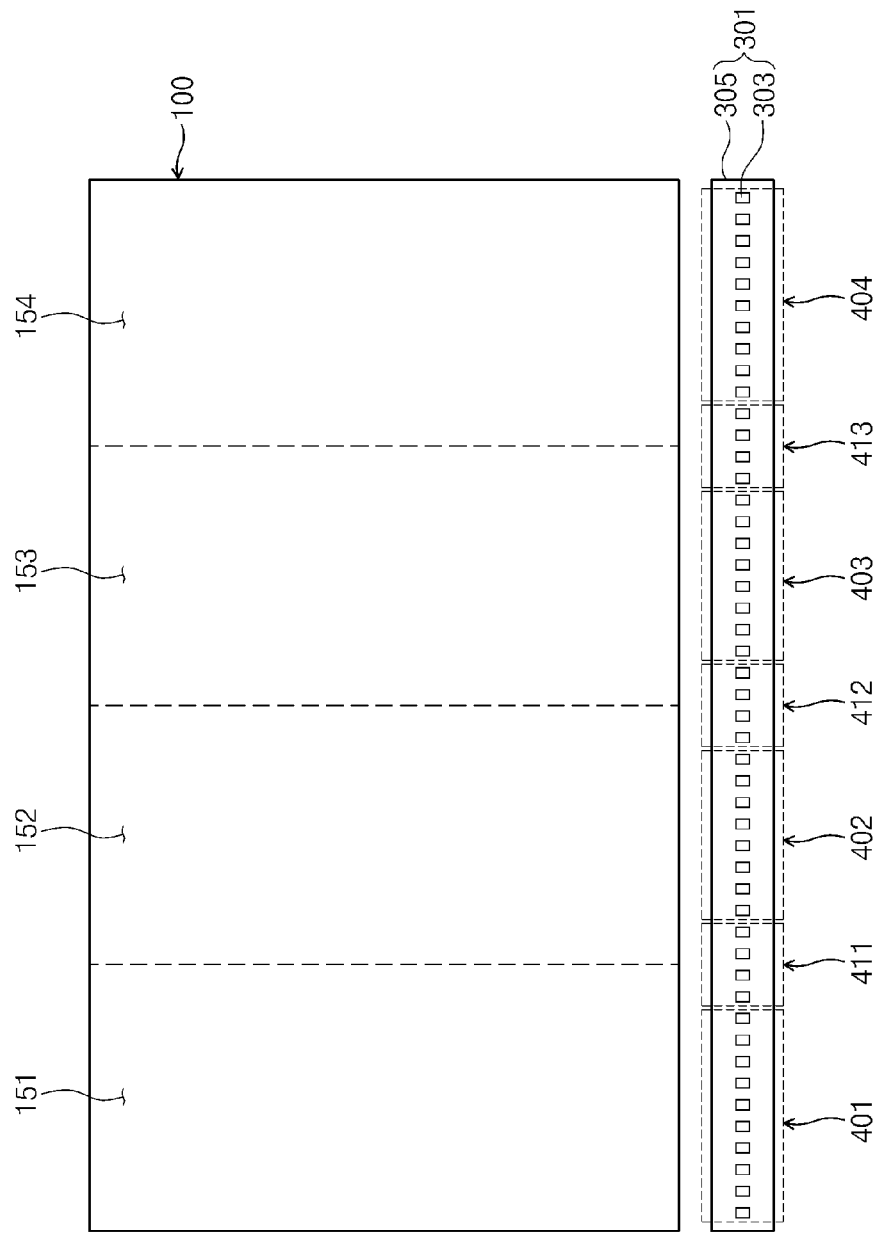
FIG. 2 is a schematic view showing an exemplary embodiment of a display panel and an exemplary embodiment of an optical unit according to the present invention.

FIG. 2 is a schematic view showing an exemplary embodiment of a display panel and an optical unit according to the present invention.

Referring to FIG. 2, the display panel 100 displays the image using the light and is divided into a plurality of display areas 151, 152, 153 and 154 corresponding to the image. For example, in the present exemplary embodiment the display panel 100 includes a first display area 151, a second display area 152, a third display area 153, and a fourth display area 154.

The optical unit 301 includes a plurality of main-light source groups 401, 402, 403, and 404 arranged corresponding to the display panel 100. Particularly, in the present exemplary embodiment the optical unit 301 includes a first main-light source group 401, a second main-light source group 402, a third main-light source group 403 and a fourth main-light source group 404, which are positioned corresponding to the first to fourth display areas 151, 152, 153, and 154, respectively. Specifically, the first main-light source group 401, the second main-light source group 402, the third main-light source group 403 and the fourth main-light source group 404, are aligned with portions of the incident surface of the light guide plate 310 corresponding to the first to fourth display areas 151, 152, 153, and 154, respectively. Each of the first to fourth main-light source groups 401, 402, 403, and 404 includes a plurality of light sources 303 mounted on the circuit substrate 305 to emit the light. The first to fourth main-light groups 401, 402, 403, and 404 receive a driving power through the circuit substrate 305 and respectively provide the light to the first to fourth display areas 151, 152, 153, and 154 in response to the driving power supplied thereto. Exemplary embodiments include configurations wherein the first to fourth main-light source groups 401, 402, 403, and 404 individually provide the light to the first to fourth display areas 151, 152, 153, and 154, respectively, corresponding to the image displayed on the first to fourth display areas 151, 152, 153 and 154. That is, each of the first to fourth main-light source groups 401, 402, 403, and 404 may have different brightnesses depending upon the image displayed on the first to fourth display areas 151, 152, 153 and 154.

The optical unit 301 includes a plurality of sub-light source groups 411, 412 and 413 each of which is arranged between two adjacent main-light source groups of the first to fourth main-light source groups 401, 402, 403 and 404. Each of the sub-light source groups 411, 412 and 413 receives the driving power applied to the two adjacent main-light source groups and provides a light corresponding to an average brightness of the two adjacent main-light source groups to a border area between two adjacent display areas corresponding to the two adjacent main-light source groups.

Particularly, the optical unit 301 includes a first sub-light source group 411 arranged between the first main-light source group 401 and the second main-light source group 402, a second sub-light source group 412 arranged between the second main-light source group 402 and the third main-light source group 403, and a third sub-light source group 413 arranged between the third main-light source group 403 and the fourth main-light source group 404.

The first sub-light source group 411 receives a first driving power applied to the first main-light source group 401 and a second driving power applied to the second main-light source group 402. The first sub-light source group 411 provides a light corresponding to an average brightness of the first main-light source group 401 and the second main-light source group 402 to a border area between the first and second display areas 151 and 152 in response to the first and second driving powers supplied to the first main-light source group 401 and the second main-light source group 402.

The second sub-light source group 412 receives the second driving power applied to the second main-light source group 402 and a third driving power applied to the third main-light source group 403. The second sub-light source group 412 provides a light corresponding to an average brightness of the second main-light source group 402 and the third main-light source group 403 to a border area between the second and third display areas 152 and 153 in response to the second and third driving powers supplied to the second main-light source group 402 and the third main-light source group 403.

The third sub-light source group 413 receives the third driving power applied to the third main-light source group 403 and a fourth driving power applied to the fourth main-light source group 404. The third sub-light source group 413 provides a light corresponding to an average brightness of the third main-light source group 403 and the fourth main-light source group 404 to a border area between the third and fourth display areas 153 and 154 in response to the third and fourth driving powers supplied to the third main-light source group 403 and the fourth main-light source group 404.

Hereinafter, an exemplary embodiment of a wiring structure of the sub-light source groups according to the present invention will be described.

Figure 3:
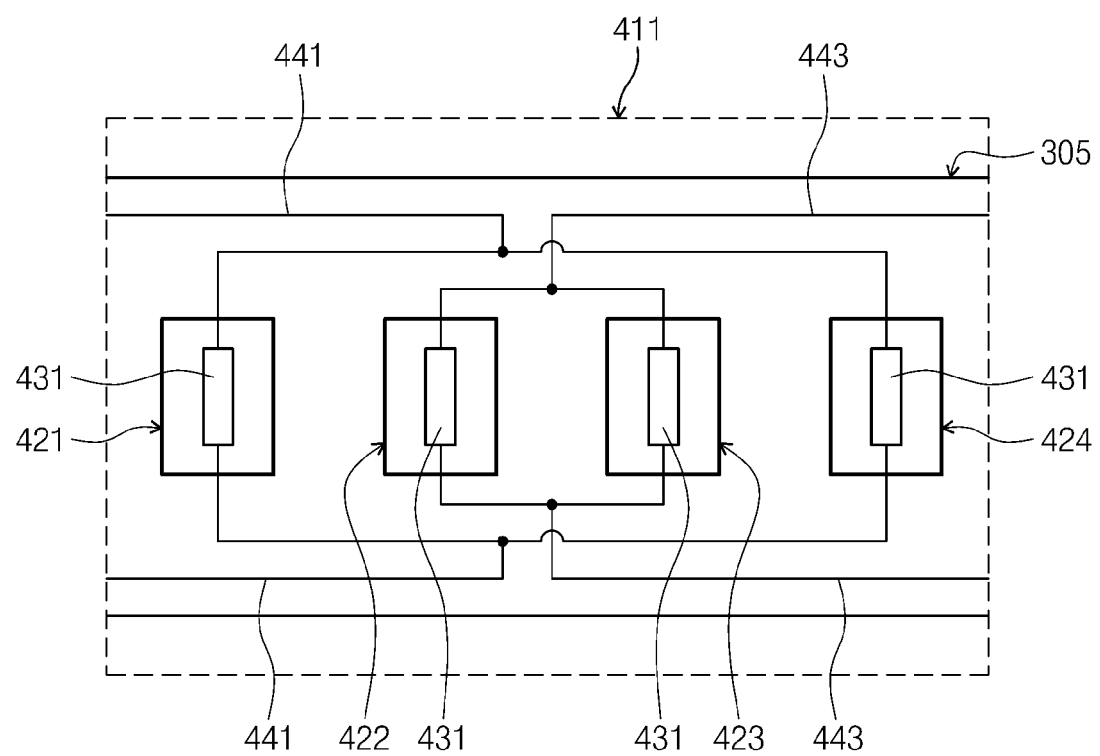
FIG. 3 is a schematic diagram showing a first exemplary embodiment of a sub-light source group according to the present invention.
Figure 4:
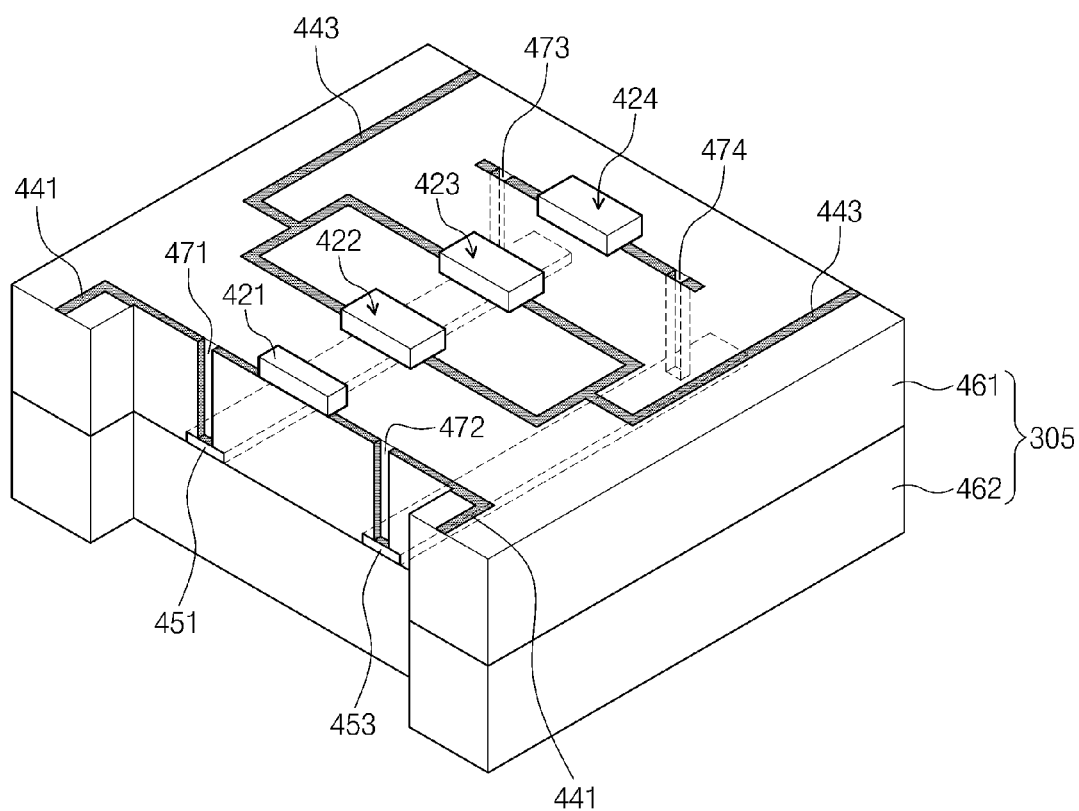
FIG. 4 is a front perspective cutaway view showing an exemplary embodiment of a structure of the sub-light source group of FIG. 3.

FIG. 3 is a schematic diagram showing a first exemplary embodiment of a sub-light source group according to the present invention, and FIG. 4 is a front perspective cutaway view showing an exemplary embodiment of a structure of the sub-light source group of FIG. 3. In FIGS. 3 and 4, since in the present exemplary embodiment the first to third sub-light source groups 411, 412, and 413 have the same structure and function, the first sub-light source group 411 will be described as a representative embodiment, and the same reference numerals denote the same elements in FIG. 2.

Referring to FIGS. 3 and 4, the first sub-light source group 411 includes a plurality of light sources 421, 422, 423, and 424 each of which has a light emitting device 431 and is mounted on the circuit substrate 305.

In detail, in the present exemplary embodiment the first sub-light source group 411 includes a first light source 421, a second light source 422, a third light source 423, and a fourth light source 424. The first light source 421 and the second light source 422 are arranged corresponding to one display area of two adjacent display areas of the display panel 100, e.g., display area 151 illustrated in FIG. 2, and the third light source 423 and the fourth light source 424 are arranged corresponding to a remaining display area of the two adjacent areas of the display panel 100, e.g., display area 152 illustrated in FIG. 2. For example, as described above, the first light source 421 and the second light source 422 are arranged corresponding to the first display area 151 of the display panel 100, and the third light source 423 and the fourth light source 424 are arranged corresponding to the second display area 152 of the display panel 100. As described above, the first sub-light source group 411 is described herein as an example only, and the other sub-light source groups would correspond to different display areas as illustrated in FIG. 2.

The first sub-light group 411 receives the driving power applied to the two adjacent main-light source groups. Specifically, the first sub-light source group 411 is connected to power source circuits 441, 443, 451, and 453 arranged on the circuit substrate 305 having at least one layer (power source circuits 451 and 453 are illustrated in FIG. 4). In the present exemplary embodiment, the circuit substrate 305 includes a first base circuit substrate 461 and a second base circuit substrate 462.

Particularly, the light emitting device 431 of each of the first light source 421 and the fourth light source 424 receives the driving power applied to one main-light source group of the two adjacent main-light source groups, and the light emitting device 431 of each of the second light source 422 and the third light source 423 receives the driving power applied to a remaining main-light source group of the two adjacent main-light source groups. In other words, in the present exemplary embodiment of the first sub-light source group 411, the light emitting devices 431 of the first and fourth light sources 421 and 424 receive the first driving power applied to the first main-light source group 401, and the light emitting devices 431 of the second and third light source sources 422 and 423 receive the second driving power applied to the second main-light source group 402.

In the present exemplary embodiment, the light emitting devices 431 of the first and fourth light sources 421 and 424 are connected to a first power source line 441 arranged on the first base circuit substrate 461 to receive the first driving power. In addition, the light emitting devices 431 of the second and third light sources 422 and 423 are connected to a second power source line 443 arranged on the first base circuit substrate 461 to receive the second driving power. The light emitting devices 431 of the first and fourth light sources 421 and 424 are connected to each other through a third power source line 451 and a fourth power source line 453 arranged on the second base circuit substrate 462. The light emitting device 431 of the first light source 421 is connected to the third power source line 451 through a first via hole 471 and connected to the fourth power source line 453 through a second via hole 472. Also, the light emitting device 431 of the fourth light source 424 is connected to the third power source line 451 through a third via hole 473 and connected to the fourth power source line 453 through a fourth via hole 474. Alternative exemplary embodiments include configurations wherein the first power source line 441 and the second power source line 443 may be arranged on the second base circuit substrate 462 and the third power source line 451 and the fourth power source line 453 may be arranged on the first base circuit substrate 461. Alternative exemplary embodiments also include configurations wherein the first power source line 441, the second power source line 443, the third power source line 451 and the fourth power source line 453 may all be disposed on one base circuit substrate, e.g., the first base circuit substrate 461. Alternative exemplary embodiments also include configurations wherein the arrangement of the connections of the light sources may be altered, e.g., first light source 421 may be connected to the second power source line 443, the second light source 422 may be connected to the first power source line 441, the third light source 423 may be connected to the first power source line 441 and the fourth light source 424 may be connected to the second power source line 443.

The first to fourth light sources 421, 422, 423 and 424 together emit the light corresponding to the average brightness of the first main-light source group 401 and the second main-light source group 402 in response to the first and second driving powers. The first to fourth light sources 421, 422, 423, and 424 together provide the light corresponding to the average brightness to the border area between the first display area 151 corresponding to the first main-light source group 401 and the second display area 152 corresponding to the second main-light source group 402.

The first sub-light source group 411 provides the light corresponding to the average brightness of the first and second main-light source groups 401 and 402 to the border area between the two adjacent display areas, so that a potential brightness difference between the two adjacent display areas decreases, thereby reducing defects in display quality, which are caused by brightness differences between the display areas.

Figure 5:
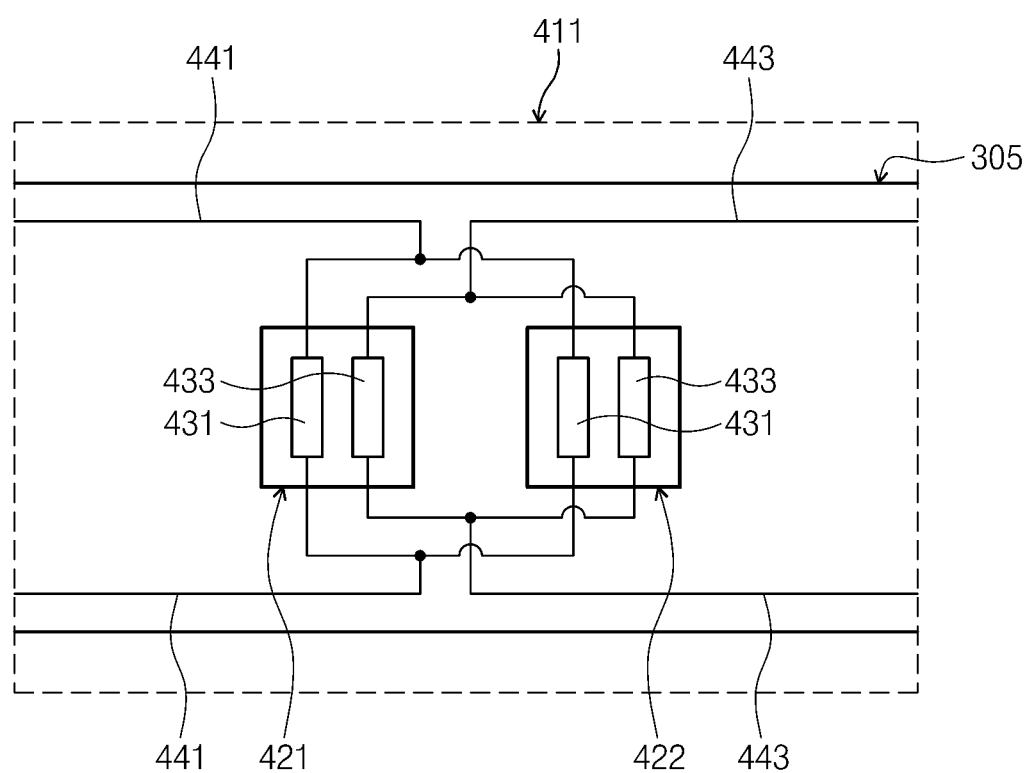
FIG. 5 is a schematic diagram showing a second exemplary embodiment of a sub-light source group according to the present invention.
Figure 6:
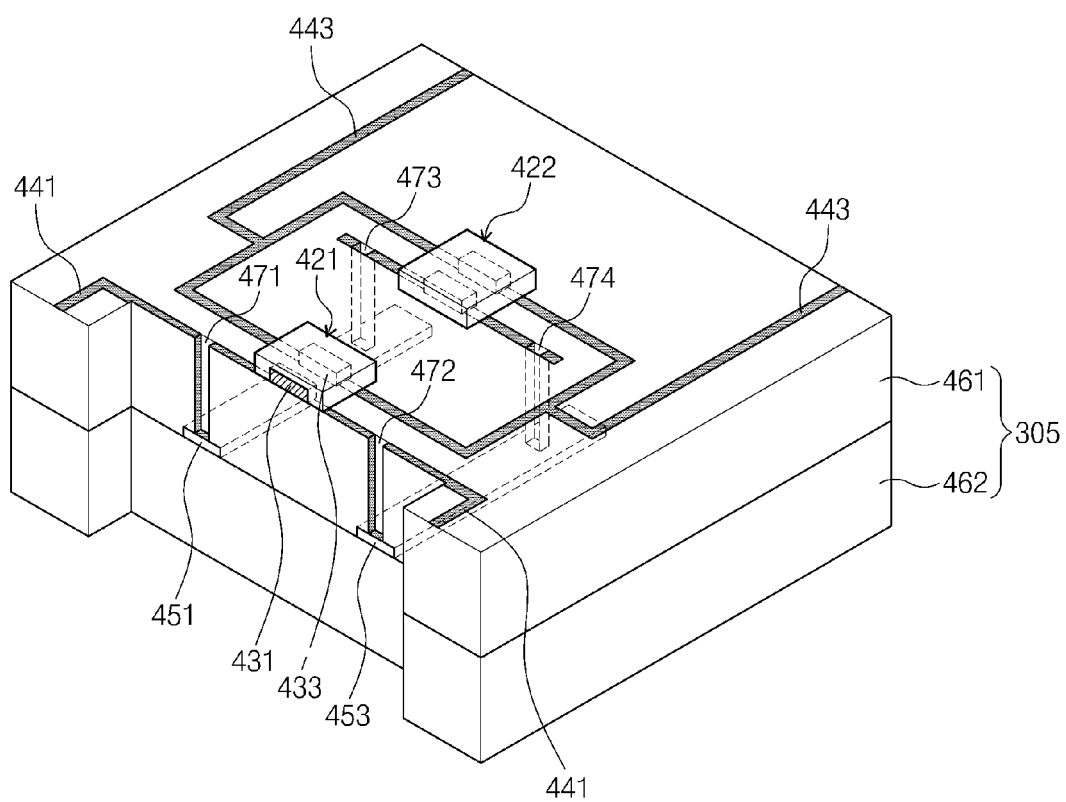
FIG. 6 is a front perspective cutaway view showing an exemplary embodiment of a structure of the sub-light source group of FIG. 5.

FIG. 5 is a schematic diagram showing a second exemplary embodiment of a sub-light source group according to the present invention, and FIG. 6 is a front perspective cutaway view showing an exemplary embodiment of a structure of the sub-light source group of FIG. 5. In FIGS. 5 and 6, since the present exemplary embodiment of the first to third sub-light source groups 411, 412, and 413 have substantially the same structure and function, the first sub-light source group 411 will be described as a representative embodiment thereof, and the same reference numerals denote the same elements in FIG. 2.

Referring to FIGS. 5 and 6, the sub-light source group 411 includes a first light source 421 and a second light source 422 each of which includes a first light emitting device 431 and a second light emitting device 433. In the present exemplary embodiment, the first light source 421 and the second light source 422 is mounted on the circuit substrate 305.

The first light source 421 is arranged corresponding to one display area of the two adjacent display areas of the display panel 100, and the second light source 422 is arranged corresponding to the remaining display area of the two adjacent display areas. For example, in the present exemplary embodiment of the sub-light source group 411, the first light source 421 and the second light source 422 are arranged respectively corresponding to the first display area 151 and the second display area 152 of the display panel 100.

The first sub-light source group 411 receives the driving power applied to the two adjacent main-light source groups. Specifically, the first sub-light source group 411 is connected to power source circuits 441, 443, 451, and 453 arranged in the circuit substrate 305 having at least one layer, similar to that described with respect to the previous exemplary embodiment. In the present exemplary embodiment, similar to the previous exemplary embodiment, the circuit substrate 305 includes a first base circuit substrate 461 and a second base circuit substrate 462.

In detail, the first light emitting devices 431 of the first and second light sources 421 and 422 receive the driving power applied to one main-light source group of the two adjacent main-light source groups, and the second light emitting devices 433 of the first and second light sources 421 and 422 receive the driving power applied to a remaining main-light source group of the two adjacent main-light source groups. That is, the first light emitting devices 431 of the first and second light sources 421 and 422 receive the first driving power applied to the first main-light source group 401, and the second light emitting devices 433 of the first and second light sources 421 and 422 receive the second driving power applied to the second main-light source group 402.

In the present exemplary embodiment, the light emitting devices 431 of the first and second light sources 421 and 422 are connected to a first power source line 441 arranged on the first base circuit substrate 461 to receive the first driving power. In addition, the second light emitting devices 433 of the first and second light sources 421 and 422 are connected to a second power source line 443 arranged on the first base circuit substrate 461. The first light emitting devices 431 of the first and second light sources 421 and 422 are connected to each other through a third power source line 451 and a fourth power source line 453 arranged on the second base circuit substrate 462 to receive the first driving power. The first light emitting device 431 of the first light source 421 is connected to the third power source line 451 through a first via hole 471 and connected to the fourth power source line 453 through a second via hole 472. Also, the first light emitting device 431 of the second light source 422 is connected to the third power source line 451 through a third via hole 473 and connected to the fourth power source line 453 through a fourth via hole 474. Similar to that described above, alternative exemplary embodiments include configurations wherein the first power source line 441 and the second power source line 443 may be arranged on the second base circuit substrate 462 and the third power source line 451 and the fourth power source line 453 may be arranged on the first base circuit substrate 461. Alternative exemplary embodiments also include configurations wherein the first power source line 441, the second power source line 443, the third power source line 451 and the fourth power source line 453 may all be disposed on one base circuit substrate, e.g., the first base circuit substrate 461. Alternative exemplary embodiments also include configurations wherein the arrangement of the connections of light emitting devices of the light sources may be altered, e.g., first light emitting device 431 of the first light source 421 may be connected to the second power source line 443, the second light emitting device of the first light source 421 may be connected to the first power source line 441, the first light emitting device 431 of the second light source 422 may be connected to the second power source line 443 and the second light emitting device 433 of the second light source 422 may be connected to the first power source line 441.

However, the wiring structure of the first sub-light source group 411 should not be limited thereto or thereby.

The first light source 421 and the second light source 422 emit the light corresponding to the average brightness of the first main-light source group 401 and the second main-light source group 402 in response to the first and second driving powers. The first and second light sources 421 and 422 provide the light corresponding to the average brightness to the border area between the first display area 151 corresponding to the first main-light source group 401 and the second display area 152 corresponding to the second main-light source group 402.

The first sub-light source group 411 provides the light corresponding to the average brightness of the first and second main-light source groups 401 and 402 to the border area between the two adjacent display areas, so that a potential brightness difference between the two display areas decreases, thereby reducing defects in display quality caused by brightness differences between the display areas.

Figure 7:
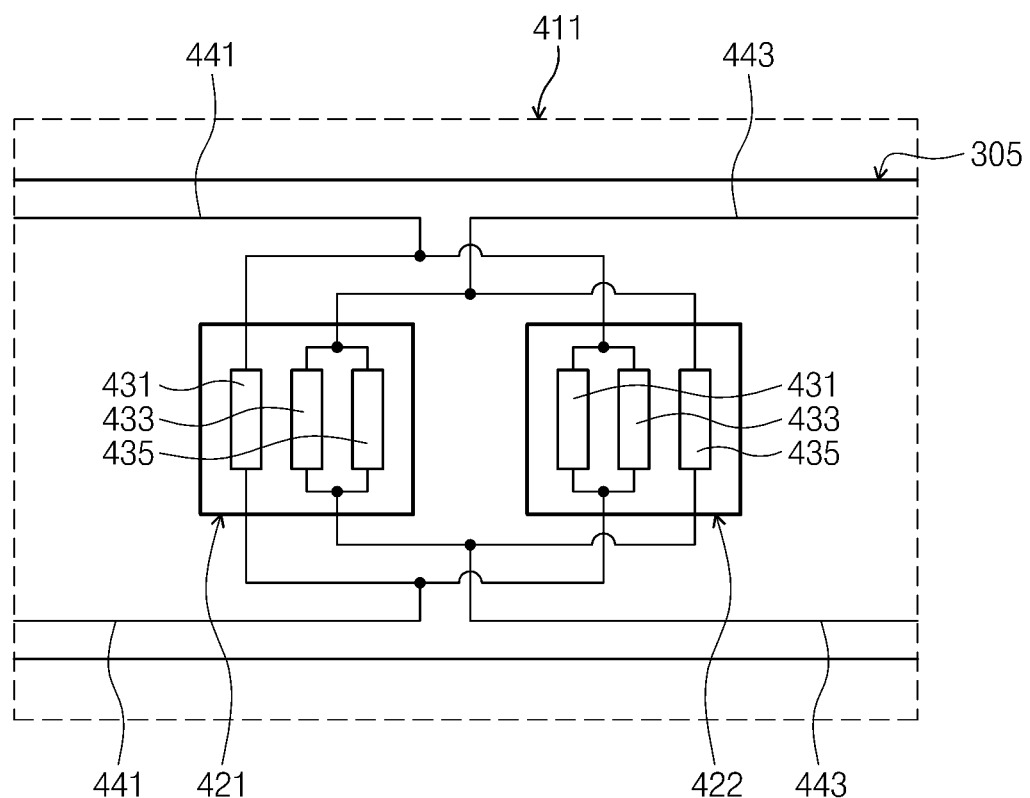
FIG. 7 is a schematic diagram showing a third exemplary embodiment of a sub-light source group according to the present invention.
Figure 8:
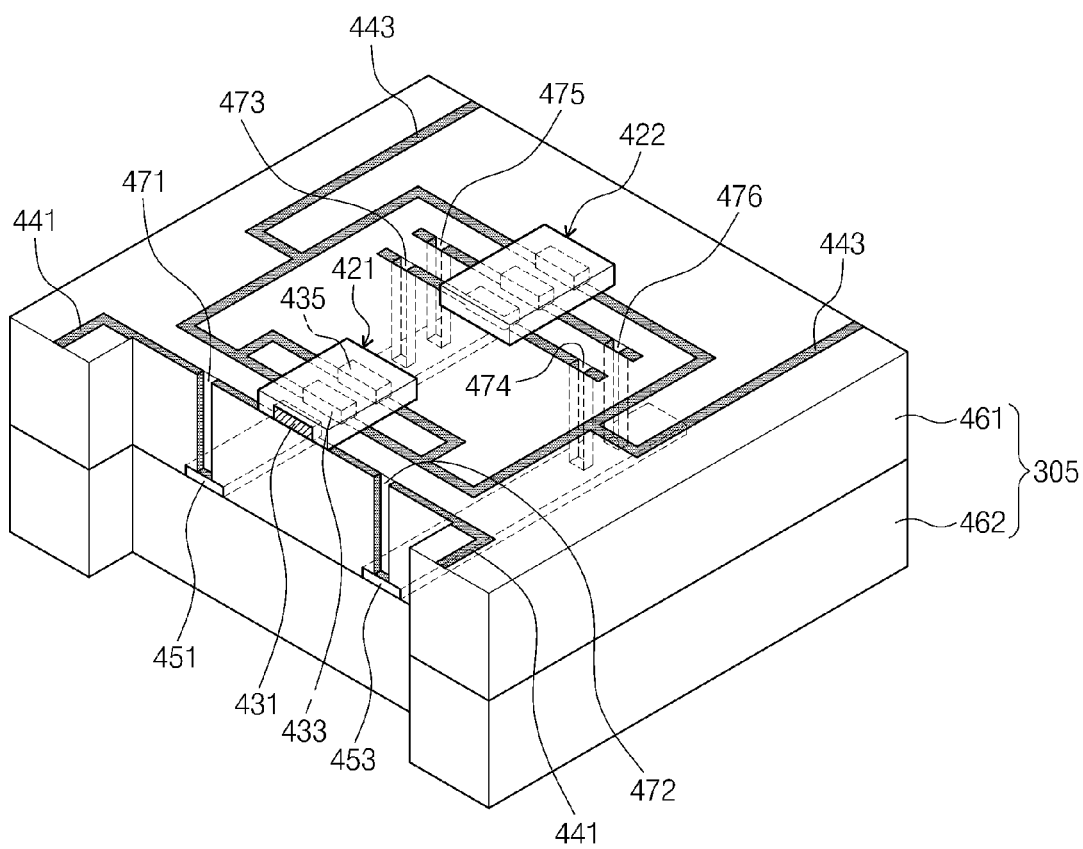
FIG. 8 is a front perspective cutaway view showing an exemplary embodiment of a structure of the sub-light source group of FIG. 7.

FIG. 7 is a schematic diagram showing a third exemplary embodiment of a sub-light source group according to the present invention, and FIG. 8 is a front perspective cutaway view showing an exemplary embodiment of a structure of the sub-light source group of FIG. 7. In FIGS. 7 and 8, since the present exemplary embodiment of first to third sub-light source groups 411, 412 and 413 have substantially the same structure and function, the first sub-light source group 411 will be described as a representative embodiment thereof, and the same reference numerals denote the same elements in FIG. 2.

Referring to FIGS. 7 and 8, the first sub-light source group 411 includes a first light source 421 and a second light source 422, each of which has a first light emitting device 431, a second light emitting device 433 and a third light emitting device 435, and is mounted on the circuit substrate 305.

The first light source 421 is arranged corresponding to one display area of the two adjacent display areas of the display panel 100, and the second light source 422 is arranged corresponding to a remaining display area of the two adjacent display areas. For example, in the present exemplary embodiment of a first sub-light group 411, the first light source 421 and the second light source 422 are arranged respectively corresponding to the first display area 151 and the second display area 152 of the display panel 100.

The first sub-light source group 411 receives a driving power applied to the two adjacent main-light source groups. Specifically, the first sub-light source group 411 is connected to power source circuits 441, 443, 451, and 453 arranged in the circuit substrate 305 having at least one layer, similar to the previous exemplary embodiment. Also similar to the previous exemplary embodiment, in the present exemplary embodiment, the circuit substrate 305 includes a first base circuit substrate 461 and a second base circuit substrate 462.

Particularly, one light emitting device among the first, second, and third light emitting devices 431, 433, 435 of the first light source 421 is connected to two light emitting devices among the first, second, and third light emitting devices 431, 433, and 435 of the second light source 422 and receives the driving power applied to one main-light source group of the two adjacent main-light source groups. In addition, remaining light emitting devices among the first, second, and third light emitting devices 431, 433, and 435 of the first light source 421 are connected to a remaining light emitting device among the first, second, and third light emitting devices 431, 433, and 435 of the second light source 422 and receive the driving power applied to a remaining main-light source group of the two adjacent main-light source groups. For example, in the present exemplary embodiment, the first light emitting device 431 of the first light source 421 and the first and second light emitting devices 431 and 433 of the second light source 422 may receive a first driving power applied to the first main-light source group 401, and the second and third light emitting devices 433 and 435 of the first light source 421 and the third light emitting device 435 of the second light source 422 may receive a second driving power applied to the second main-light source group 402.

The first light emitting device 431 of the first light source 421 and the first and second light emitting devices 431 and 433 of the second light source 422 are connected to a first power source line 441 arranged in the first base circuit substrate 461 to receive the first driving power. In addition, the second and third light emitting devices 433 and 435 of the first light source 421 and the third light emitting device 435 of the second light source 422 are connected to a second power source line 443 arranged in the first base substrate 461 to receive the second driving power. The first light emitting device 431 of the first light source 421 is connected to the first and second light emitting devices 431 and 433 of the second light source 422 through a third power source line 451 and a fourth power source line 453 arranged in the second base circuit substrate 462 to receive the first driving power. The first light emitting device 431 of the first light source 421 is connected to the third power source line 451 through a first via hole 471 and connected to the fourth power source line 453 through a second via hole 472. The first light emitting device 431 of the second light source 422 is connected to the third power source line 451 through a third via hole 473 and connected to the fourth power source line 453 through a fourth via hole 474. Also, the second light emitting device 433 of the second light source 422 is connected to the third power source line 451 through a fifth via hole 475 and connected to the fourth power source line 453 through a sixth via hole 476.

Alternative exemplary embodiments include configurations wherein the first and second light emitting devices 431 and 432 of the second light source 422 are commonly connected on the first base circuit substrate 461 and then connected to the third power source line 451 through a single via hole and connected to the fourth power source line 453 through a single via hole.

Similar to that described above, alternative exemplary embodiments include configurations wherein the first power source line 441 and the second power source line 443 may be arranged on the second base circuit substrate 462 and the third power source line 451 and the fourth power source line 453 may be arranged on the first base circuit substrate 461. Alternative exemplary embodiments also include configurations wherein the first power source line 441, the second power source line 443, the third power source line 451 and the fourth power source line 453 may all be disposed on one base circuit substrate, e.g., the first base circuit substrate 461. Alternative exemplary embodiments also include configurations wherein the arrangement of the connections of light emitting devices of the light sources may be altered, e.g., first light emitting device 431 of the first light source 421 may be connected to the second power source line 443, the second and third light emitting devices of the first light source 421 may be connected to the first power source line 441, the first and second light emitting devices 431 and 433 of the second light source 422 may be connected to the second power source line 443 and the third light emitting device 435 of the second light source 422 may be connected to the first power source line 441. Alternative exemplary embodiments also include configurations wherein the commonly connected light emitting devices of the light sources may be differently arranged, e.g., the first and third light emitting devices 431 and 435 of the first light source 421 may be commonly connected, etc.

However, the wiring structure of the first sub-light source group 411 should not be limited to the above-described wiring structure.

The first light source 421 and the second light source 422 emit the light corresponding to the average brightness of the first and second main-light source groups 401 and 402 in response to the first and second driving powers. The first and second light sources 421 and 422 provide the light corresponding to the average brightness to the border area between the first display area 151 corresponding to the first main-light source group 401 and the second display area 152 corresponding to the second main-light source group 402.

The first sub-light source group 411 provides the light corresponding to the average brightness of the first and second main-light source groups 401 and 402 to the border area between the two adjacent display areas, to thereby decrease a potential brightness difference between the two display areas and reduce defects in display quality caused by brightness differences between the display areas.

Figure 9:
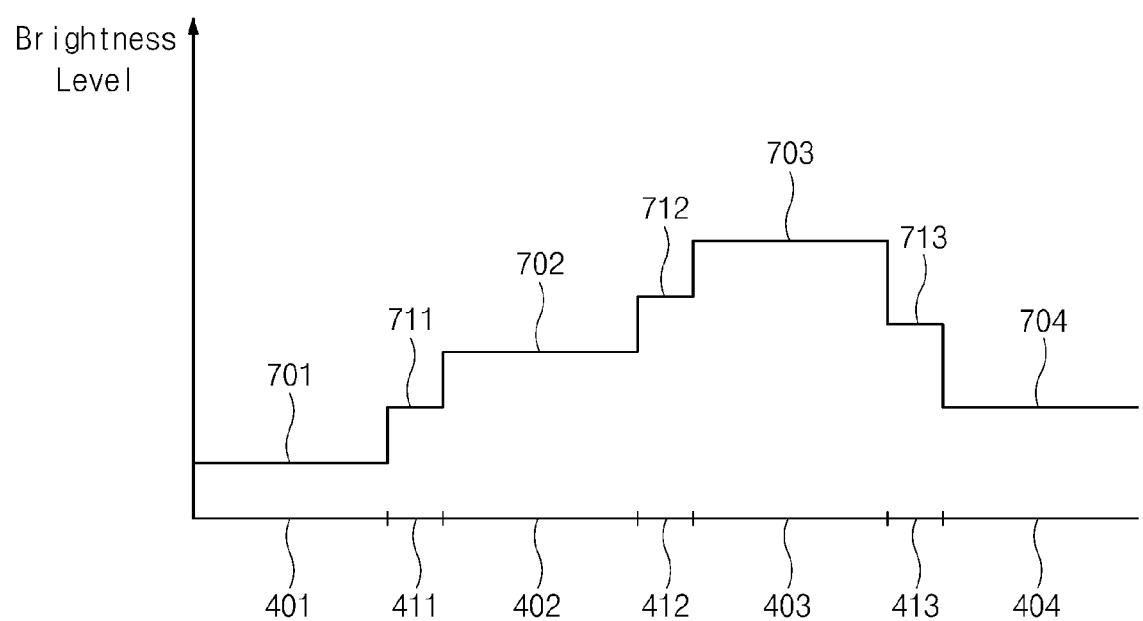
FIG. 9 is a graph showing a brightness distribution of a light emitted from an exemplary embodiment of an optical unit according to the present invention.

FIG. 9 is a graph showing a brightness distribution of a light emitted from an exemplary embodiment of an optical unit according to the present invention. In FIG. 9, a horizontal axis represents positions of main-light source groups and sub-light source groups and a vertical axis represents a brightness level.

Referring to FIG. 9, the first to fourth main-light source groups 401, 402, 403 and 404 included in the optical unit 301 provide the lights having potentially different brightnesses to the first to fourth display areas 151, 152, 153, and 154, respectively, corresponding to the image displayed in the first to fourth display areas 151, 152, 153, and 154; again, as illustrated in FIG. 9 the brightnesses of the display areas 151, 152, 153 and 154 are different, but the brightnesses of the display areas are a function of the image displayed thereon and may vary accordingly. The first to fourth main-light source groups 401, 402, 403 and 404 provide the lights each having a first brightness level 701, a second brightness level 702, a third brightness level 703 and a fourth brightness level 704 to the first to fourth display areas 151, 152, 153, and 154, respectively. In addition, the first to third sub-light source groups 411, 412, and 413 of the optical unit 301 respectively provide the lights having a fifth brightness level 711, a sixth brightness level 712, and a seventh brightness level 713 to the border areas between the first to fourth display areas 151, 152, 153, and 154, respectively.

The fifth brightness level 711 corresponds to the average brightness of the first brightness level 701 and the second brightness level 702, the sixth brightness level 712 corresponds to the average brightness of the second brightness level 702 and the third brightness level 703 and the seventh brightness level 713 corresponds to the average brightness of the third brightness level 703 and the fourth brightness level 704.

As described above, the optical unit 301 provides the lights having the fifth brightness level 711, the sixth brightness level 712, and the seventh brightness level 713 to the border areas, so that the brightness difference between the adjacent display areas decreases, thereby reducing defects in display quality caused by brightness differences between the display areas.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A display apparatus comprising:
a display panel which displays an image using a light, wherein the display panel is divided into a plurality of display areas corresponding to the image;
a plurality of main-light source groups which each have a plurality of light sources, wherein the plurality of main-light source groups are respectively arranged corresponding to the plurality of display areas to provide the light to the plurality of display areas;
a power source circuit connected to each of the plurality of main-light source groups to supply a corresponding driving power to each main-light source group; and
a plurality of sub-light source groups, each of which is arranged between a first main-light source group and a second main-light source group of the plurality of main-light source groups and wherein a first sub-light group of the plurality of sub-light source groups receives a first driving power applied to the first main-light source groups and a second sub-light group of the plurality of sub-light source groups receives a second driving power applied to the second main-light source groups to provide a light corresponding to an average brightness of the first and second main-light source groups to a border area positioned between two adjacent display areas of the plurality of display areas, the second driving power separate from the first driving power,
wherein each of the sub-light source groups comprises a first light source and a second light source which receive the first driving power applied to the first main-light source group and a third light source and a fourth light source which receive the second driving power applied to the second main-light source group.

2. The display apparatus of claim 1, further comprising a circuit substrate comprising at least one layer on which the power source circuit is arranged, wherein the plurality of light sources are mounted thereon.

3. The display apparatus of claim 2, wherein each light source comprises a light emitting device which generates the light.

4. The display apparatus of claim 2, wherein each of the plurality of light sources comprises a first light emitting device, a second light emitting device and a third light emitting device which each generate the light.

5. The display apparatus of claim 1, wherein the first light source and the third light source are arranged corresponding to a single display area of the two adjacent display areas, and the second light source and the fourth light source are arranged corresponding to a remaining single display area of the two adjacent display areas.

6. The display apparatus of claim 5, wherein the circuit substrate comprises:
a first layer; and
a second layer disposed on the first layer,
wherein the power source circuit is arranged on each of the first layer and the second layer of the circuit substrate connects the light emitting device of the first light source to the light emitting device of the second light source, and connects the light emitting device of the third light source to the light emitting device of the fourth light source.

7. The display apparatus of claim 1, further comprising:
a light guide plate arranged adjacent to the plurality of main-light source groups and the plurality of sub-light source groups to guide the light emitted from the plurality of main-light source groups and the plurality of sub-light source groups to each of the display areas of the display panel.

8. A display apparatus comprising:
a display panel which displays an image using a light, wherein the display panel is divided into a plurality of display areas corresponding to the image;
a plurality of main-light source groups which each have a plurality of light sources, wherein the plurality of main-light source groups are respectively arranged corresponding to the plurality of display areas to provide the light to the plurality of display areas;
a power source circuit connected to each of the plurality of main-light source groups to supply a corresponding driving power to each main-light source group;
a plurality of sub-light source groups, each of which is arranged between a first main-light source group and a second main-light source group of the plurality of main-light source groups and wherein a first sub-light group of the plurality of sub-light source groups receives a first driving power applied to the first main-light source groups and a second sub-light group of the plurality of sub-light source groups receives a second driving power applied to the second main-light source groups to provide a light corresponding to an average brightness of the first and second main-light source groups to a border area positioned between two adjacent display areas of the plurality of display areas; and,
a circuit substrate comprising at least one layer on which the power source circuit is arranged, wherein the plurality of light sources are mounted thereon,
wherein each of the light sources comprises a first light emitting device and a second light emitting device which generate the light, and wherein each of the sub-light source groups comprises a first light source and a second light source disposed adjacent to each other, and each of the first light source and the second light source comprises a first light emitting device which receives the driving power applied to the first main-light source group and a second light emitting device which receives the second driving power applied to the second main-light source group.

9. The display apparatus of claim 8, wherein the first light source is arranged corresponding to a single display area among the two adjacent display areas, and the second light source is arranged corresponding to a remaining single display area of the two adjacent display areas.

10. The display apparatus of claim 9, wherein the circuit substrate comprises:
   a first layer; and
   a second layer disposed on the first layer,
   wherein the power source circuit is arranged on each of the first layer and the second layer of the circuit substrate and connects the first light emitting device of the first light source to the first light emitting device of the second light source, and connects the second light emitting device of the first light source to the second light emitting device of the second light source.

11. A display apparatus comprising:
   a display panel which displays an image using a light, wherein the display panel is divided into a plurality of display areas corresponding to the image;
   a plurality of main-light source groups which each have a plurality of light sources, wherein the plurality of main-light source groups are respectively arranged corresponding to the plurality of display areas to provide the light to the plurality of display areas;
   a power source circuit connected to each of the plurality of main-light source groups to supply a corresponding driving power to each main-light source group;
   a plurality of sub-light source groups, each of which is arranged between a first main-light source group and a second main-light source group of the plurality of main-light source groups and wherein a first sub-light group of the plurality of sub-light source groups receives a first driving power applied to the first main-light source groups and a second sub-light group of the plurality of sub-light source groups receives a second driving power applied to the second main-light source groups to provide a light corresponding to an average brightness of the first and second main-light source groups to a border area positioned between two adjacent display areas of the plurality of display areas; and
   a circuit substrate comprising at least one layer on which the power source circuit is arranged, wherein the plurality of light sources are mounted thereon,
   wherein each of the plurality of light sources comprises a first light emitting device, a second light emitting device and a third light emitting device which each generate the light,
   wherein each of the sub-light source groups comprises a first light source and a second light source disposed adjacent to each other, wherein the first light source comprises:
   one light emitting device among the first, second and third light emitting devices which receives the driving power applied to one main-light source group of the two main-light source groups adjacent thereto; and
   remaining two light emitting devices among the first, second, and third light emitting devices which receive the driving power applied to a remaining main-light source group of the two main-light source groups adjacent thereto, and
   wherein the second light source comprises:
   two light emitting devices among the first, second, and third light emitting devices which receive the driving power applied to one main-light source group of the two main-light source groups adjacent thereto; and
   a remaining light emitting device among the first, second, and third light emitting devices which receives the driving power applied to a remaining main-light source group of the two main-light source groups adjacent thereto.

12. The display apparatus of claim 11, wherein the first light source is arranged corresponding to a single display area of the two adjacent display areas, and the second light source is arranged corresponding to a remaining single display area of the two adjacent display areas.

13. The display apparatus of claim 12, wherein the circuit substrate comprises:
   a first layer; and
   a second layer disposed on the first layer,
   wherein the power source circuit is arranged on each of the first layer and the second layer of the circuit substrate, connects one light emitting device among the first, second, and third light emitting devices of the first light source to two light emitting devices among the first, second, and third light emitting devices of the second light source, and connects remaining two light emitting devices of the first light source to a remaining one light emitting device of the second light source.

14. A display apparatus comprising:
   a display panel which displays an image using a light, wherein the display panel is divided into a plurality of display areas corresponding to the image;
   a plurality of main-light source groups each having a plurality of light sources, wherein the plurality of main-light source groups are respectively arranged corresponding to the display areas and provide the light to the display areas;
   a power source circuit connected to each of the plurality of main-light source groups, wherein the power source circuit supplies a corresponding driving power to the plurality of main-light source groups; and
   at least one sub-light source group arranged between a first main-light source group of the plurality of main-light source groups and a second main-light source group of the plurality of main-light source groups, wherein the at least one sub-light source group is arranged adjacent to, and receives a first driving power applied to, the first main-light source group and wherein the at least one sub-light source group is arranged adjacent to, and receives a second driving power applied to, the second main-light source group and provides a light corresponding to an average brightness value of the first main-light source group and the second main-light source group to a border area of a first display area and a second display area that are arranged adjacent to one another and corresponding to the first main-light source group and the second main-light source group, respectively, the second driving power separate from the first driving power,
   wherein each of the at least one sub-light source groups comprises a first light source and a second light source which receive the first driving power applied to the first main-light source group and a third light source and a fourth light source which receive the second driving power applied to the second main-light source group.

15. A display apparatus comprising:
a display panel which displays an image using a light, wherein the display panel is divided into a plurality of display areas corresponding to the image;
a plurality of main-light source groups which each have a plurality of light sources, wherein the plurality of main-light source groups are respectively arranged corresponding to the plurality of display areas to provide the light to the plurality of display areas;
a power source circuit connected to each of the plurality of main-light source groups to supply a corresponding driving power to each main-light source group; and
a plurality of sub-light source groups, each of which is arranged between two adjacent main-light source groups of the plurality of main-light source groups and wherein each sub-light group of the plurality of sub-light source groups receives the corresponding driving power applied to each of the two main-light source groups adjacent thereto to provide a light corresponding to an average brightness of the two adjacent main-light source groups to a border area positioned between two adjacent display areas of the plurality of display areas;
wherein each of the sub-light source groups comprises a first light source and a second light source which receive a first driving power of the corresponding driving power applied to one main-light source group of the two main-light source groups adjacent thereto and a third light source and a fourth light source which receive a second driving power of the corresponding driving power applied to a remaining main-light source group of the two main-light source groups adjacent thereto, the second driving power separate from the first driving power.

16. The display apparatus of claim 15, wherein the first light source and the third light source are arranged corresponding to a single display area of the two adjacent display areas, and the second light source and the fourth light source are arranged corresponding to a remaining single display area of the two adjacent display areas.

17. The display apparatus of claim 16, wherein the circuit substrate comprises:
a first layer; and
a second layer disposed on the first layer,
wherein the power source circuit is arranged on each of the first layer and the second layer of the circuit substrate connects the light emitting device of the first light source to the light emitting device of the second light source, and connects the light emitting device of the third light source to the light emitting device of the fourth light source.

* * * * *